(12) United States Patent
Broome et al.

(10) Patent No.: US 10,961,982 B2
(45) Date of Patent: Mar. 30, 2021

(54) METHOD OF JOINING BLADE SECTIONS USING THERMOPLASTICS

(71) Applicant: General Electric Company, Schenectady, NY (US)

(72) Inventors: Peter Anthony Broome, Park Ridge, IL (US); Paul Trevor Hayden, Southampton (GB)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 15/805,473

(22) Filed: Nov. 7, 2017

(65) Prior Publication Data

US 2019/0136833 A1    May 9, 2019

(51) Int. Cl.
| | |
|---|---|
| *F03D 13/10* | (2016.01) |
| *F03D 1/06* | (2006.01) |
| *B29C 65/00* | (2006.01) |

(52) U.S. Cl.
CPC ............. *F03D 13/10* (2016.05); *B29C 65/00* (2013.01); *F03D 1/0675* (2013.01); *F05B 2230/50* (2013.01); *F05B 2240/302* (2013.01); *F05B 2280/4007* (2013.01)

(58) Field of Classification Search
CPC .... F03D 13/10; F03D 1/0675; F05B 2230/50; B29C 65/00; B29C 65/02; B29C 65/18; B29D 99/0028
See application file for complete search history.

(56) References Cited

U.S. PATENT DOCUMENTS

| 1,887,424 A | 11/1932 | Perazzoli |
|---|---|---|
| 2,921,492 A | 1/1960 | Worth |
| 3,259,021 A | 7/1966 | Appleton et al. |

(Continued)

FOREIGN PATENT DOCUMENTS

| DE | 102007026100 A1 | 12/2008 |
|---|---|---|
| DE | 102014118004 B3 | 3/2016 |

(Continued)

OTHER PUBLICATIONS

U.S. Appl. No. 15/437,776, filed Feb. 21, 2017.
International Search Report, dated Jun. 26, 2019 for Application No. PCT/US2018/059566.

*Primary Examiner* — Erick A Solis
*Assistant Examiner* — Robert A Werner
(74) *Attorney, Agent, or Firm* — Dority & Manning, P.A.

(57) ABSTRACT

A segmented rotor blade for a wind turbine includes a first rotor blade segment, a second rotor blade segment, at least one thermoplastic material, and an internal pressure source. The first rotor blade segment includes a first joint end. The second rotor blade segment includes a second joint end. The first and second joint ends are arranged together in an end-to-end orientation so as to form at least one scarf joint. The at least one thermoplastic material is arranged at each of the first and second joint ends. The first and second joint ends of the first and second rotor blade segments are bonded together via thermoplastic welding of the at least one thermoplastic material. The internal pressure source provides pressure to the scarf joint during the thermoplastic welding. The internal pressure source remains within the rotor blade after thermoplastic welding is complete.

8 Claims, 9 Drawing Sheets

(56) References Cited

U.S. PATENT DOCUMENTS

| | | |
|---|---|---|
| 3,450,001 A | 6/1969 | Fortune |
| 3,456,555 A | 7/1969 | Dunlap |
| 3,476,013 A | 11/1969 | Zemberry |
| 4,102,245 A | 7/1978 | Cousins |
| 4,389,162 A | 6/1983 | Doellinger et al. |
| 4,434,824 A | 3/1984 | Bussey |
| 4,489,634 A | 12/1984 | Volk |
| 4,614,466 A | 9/1986 | Snyder |
| 4,615,654 A | 10/1986 | Shaw |
| 4,740,453 A | 4/1988 | Nakamura et al. |
| 4,770,216 A | 9/1988 | Ruscak |
| 5,333,385 A | 8/1994 | Chou |
| 5,354,175 A | 10/1994 | Coleman et al. |
| 5,468,099 A | 11/1995 | Wheetley et al. |
| 5,499,904 A | 3/1996 | Wallace et al. |
| 6,158,666 A | 12/2000 | Banks et al. |
| 6,467,385 B1 | 10/2002 | Buttrick et al. |
| 6,843,328 B2 | 1/2005 | Boyl-Davis et al. |
| 7,216,408 B2 | 5/2007 | Boyl-Davis et al. |
| 7,334,989 B2 | 2/2008 | Arelt |
| 7,364,407 B2 | 4/2008 | Grabau et al. |
| 7,481,624 B2 | 1/2009 | Wobben |
| 7,540,716 B2 | 6/2009 | Wobben |
| 7,690,895 B2 | 4/2010 | Moroz |
| 7,740,453 B2 | 6/2010 | Zirin et al. |
| 7,794,183 B2 | 9/2010 | Wright et al. |
| 7,794,209 B2 | 9/2010 | Wobben |
| 7,841,836 B2 | 11/2010 | Wobben |
| 7,854,594 B2 | 12/2010 | Judge |
| 7,891,941 B2 | 2/2011 | Chen et al. |
| 7,922,454 B1 | 4/2011 | Riddell |
| 7,931,444 B2 | 4/2011 | Godsk et al. |
| 7,997,874 B2 | 8/2011 | van der Bos |
| 7,998,303 B2 | 8/2011 | Bachmann et al. |
| 8,075,275 B2 | 12/2011 | Althoff et al. |
| 8,167,569 B2 | 5/2012 | Livingston |
| 8,172,538 B2 | 5/2012 | Hancock et al. |
| 8,172,539 B2 | 5/2012 | Kootstra |
| 8,240,962 B2 | 8/2012 | Livingston et al. |
| 8,393,871 B2 | 3/2013 | Yarbrough |
| 8,449,259 B1 | 5/2013 | Kaser |
| 8,517,689 B2 | 8/2013 | Kyriakides et al. |
| 8,562,296 B2 | 10/2013 | Arocena De La Rua et al. |
| 8,896,980 B2 | 11/2014 | Kristensen et al. |
| 8,918,997 B2 | 12/2014 | Kyriakides et al. |
| 9,051,921 B2 | 6/2015 | Arocena De La Rua et al. |
| 9,683,548 B2 | 6/2017 | Johnson et al. |
| 2002/0168241 A1 | 11/2002 | David et al. |
| 2004/0265077 A1 | 12/2004 | Boyl-Davis et al. |
| 2006/0060030 A1 | 3/2006 | Lowder |
| 2007/0231139 A1 | 10/2007 | Yokoi |
| 2008/0069699 A1 | 3/2008 | Bech |
| 2008/0181733 A1 | 7/2008 | Wright et al. |
| 2009/0072439 A1* | 3/2009 | Karem ............ F01D 5/147 264/258 |
| 2009/0095141 A1 | 4/2009 | Billings et al. |
| 2009/0116962 A1 | 5/2009 | Pedersen et al. |
| 2009/0143207 A1 | 6/2009 | Wampler et al. |
| 2009/0250847 A1* | 10/2009 | Burchardt ......... B29C 33/0061 264/511 |
| 2010/0122444 A1 | 5/2010 | Reid et al. |
| 2010/0135814 A1 | 6/2010 | Bakhuis et al. |
| 2010/0266416 A1* | 10/2010 | Marshall ............ B64C 27/473 416/226 |
| 2010/0304170 A1* | 12/2010 | Frederiksen .......... B29C 65/70 428/542.8 |
| 2011/0091326 A1 | 4/2011 | Hancock |
| 2011/0243736 A1 | 10/2011 | Bell |
| 2012/0014759 A1 | 1/2012 | Sarh et al. |
| 2012/0027594 A1 | 2/2012 | Lewke et al. |
| 2012/0082547 A1* | 4/2012 | Baker ................ F03D 1/0675 416/1 |
| 2012/0141287 A1 | 6/2012 | Hynum et al. |
| 2014/0237793 A1 | 8/2014 | Gamboa |
| 2015/0204193 A1* | 7/2015 | Anasis ................. F01D 5/005 29/889.1 |
| 2015/0240780 A1 | 8/2015 | Leonard et al. |
| 2015/0369211 A1 | 12/2015 | Merzhaeuser |
| 2016/0163415 A1 | 6/2016 | Wallenius et al. |
| 2016/0215757 A1 | 7/2016 | Behmer et al. |
| 2016/0298608 A1 | 10/2016 | Whitehouse et al. |
| 2016/0354968 A1* | 12/2016 | Zamora Rodriguez ................ B29D 99/0028 |
| 2017/0074236 A1* | 3/2017 | Hynum .............. F03D 1/0675 |

FOREIGN PATENT DOCUMENTS

| | | |
|---|---|---|
| EP | 2390498 A1 | 11/2011 |
| WO | WO 01/46582 A2 | 6/2001 |
| WO | WO2005/064156 A1 | 7/2005 |
| WO | WO2009/130467 A2 | 10/2009 |
| WO | WO2009/135902 A2 | 11/2009 |
| WO | WO2010/003847 A2 | 1/2010 |
| WO | WO-2010025830 A2 * | 3/2010 ........ B29C 65/364 |
| WO | WO 2016/189092 A1 | 12/2016 |

* cited by examiner

METHOD OF JOINING BLADE SECTIONS USING THERMOPLASTICS

FIELD

The present subject matter relates generally to wind turbines, and more particularly to segmented rotor blades for wind turbines and methods of manufacturing the same.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles and transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, opposing spar caps, and one or more shear webs extending between the opposing spar caps. The skin is typically manufactured from layers of fiber composite and a lightweight core material and forms the exterior aerodynamic airfoil shape of the rotor blade. Further, the spar caps provide increased rotor blade strength by providing structural elements along the span of the rotor blade on both interior sides of the rotor blade. Moreover, spar caps are typically constructed from glass fiber reinforced composites, though spar caps for some larger blades may be constructed from carbon fiber reinforced composites. The shear web(s) generally include structural beam-like components that extend essentially perpendicular between the opposing spar caps and across the interior portion of the rotor blade between the outer skins.

The size, shape, and/or weight of rotor blades are factors that contribute to energy efficiencies of wind turbines. An increase in rotor blade size increases the energy production of a wind turbine, while a decrease in weight also furthers the efficiency of a wind turbine. Furthermore, as the size of wind turbines increases, particularly the size of the rotor blades, so do the respective costs of manufacturing, transporting, and assembly of the wind turbines. The economic benefits of increased wind turbine sizes must be weighed against these factors.

One known strategy for reducing the costs of pre-forming, transporting, and erecting wind turbines having rotor blades of increasing sizes is to manufacture the rotor blades in blade segments. As such, the blade segments may be assembled to form the rotor blade after, for example, the individual blade segments are transported to an erection location. For example, some rotor blades include either bonded or bolted joints. One such bolted joint includes a chord-wise extending pin securing a male shear web member or spar member within a female shear web member so as to join adjacent blade segments.

Various structural bonds may be used to join blade segments. First, elements of the structural 'I' beam, such as the skins of the shear web and the spar caps, may be used to join blade segments. Further, fasteners may be used to join longitudinal bulkheads and/or similar structures. Moreover, the outer skin and/or aerodynamic fairings may be joined using a shell-to-shell connection.

In addition, the outer skin typically forms the exterior aerodynamic airfoil shape of the rotor blade. In some turbine blades, the outer skin does not form a complete enclosure. More specifically, gaps and spaces may be left between the blade segments. As such, aerodynamic fairings can be used to cover the gaps and/or spaces between the blade segments to reduce form drag and interference drag. Such fairings may also improve the performance of the turbine blade. Moreover, the fairings can be joined together and/or to the outer skin using shell-to-shell connections.

A number of challenges may be involved in achieving the aforementioned connections, particularly with the outer skin bond. For example, the outer skin may be joined along scarf joints using adhesives, thermoplastics, and/or pre-preg film. Such methods often require internal and external pressures applied at the joint simultaneously. Such pressures maintain segments together and can allow for the formation of a strong bond at the joint.

The internal pressure, however, can be difficult to achieve and maintain on the mating surfaces during the bond process. Of particular concern is the internal consolidation pressure in areas of the turbine blade that are inaccessible. For instance, the portion of the rotor blade at the tip is often smaller and cannot be easily reached using conventional methods. The internal consolidation pressure necessary at these inaccessible areas is generally referred to as blind pressure.

Structural requirements must also be considered, such as, adequate transfer of the load (especially through 0° direction fibers). For example, the joint should be able to successfully transfer the load across the inner and outer skins on either side of the structural core. In addition, the surface bonds and sub-component bonds must be accurately aligned with smooth transitions to ensure suitable aerodynamic shape and performance. Further, in order to achieve a stronger bond using thermoplastics, separate mechanical and/or chemical adhesion are critical via controlled heat and pressure.

Accordingly, some outer skin bonds utilize adhesives at the joint locations. However, certain adhesive bonds provide additional challenges. For example, wet adhesives can be difficult to apply without air bubbles and/or may provide uneven coverage with slide-in assemblies, thereby requiring rectification of the aerodynamic surface. Additionally, adhesive squeeze-out can cause parasitic weight, undesirable spills, a subpar bond, and/or undesirable clean-up. Further, the ability to reposition the surfaces can be limited due to the risk of introducing air and/or air pockets in the adhesive.

Still further outer skin bonds use injection bonding or pre-preg film. Injection bonding, however, can present challenges with the internal seal and consolidation. In addition, pre-preg film can increase cost as extreme accuracy is required for the sealing and consolidation. Further, these processes may require vacuum sealing, which can increase costs and production time.

Accordingly, the art is continuously seeking new and improved joint technologies for joining blade segments of rotor blades. More specifically, there is a need for a joint assembly for rotor blade segments that simplifies and expedites the assembly thereof.

BRIEF DESCRIPTION

Aspects and advantages of the invention will be set forth in part in the following description, or may be obvious from the description, or may be learned through practice of the invention.

In one aspect, the present disclosure is directed to a method for joining rotor blade segments of a rotor blade. The method includes placing at least one inflatable internal bladder at least partially within at least one of a first blade segment or a second blade segment. Another step includes arranging a first joint end of the first blade segment with a second joint end of the second blade segment at a joint. Each of the first and second joint ends includes at least one thermoplastic material. Another step includes arranging the first and second joints ends in an end-to-end orientation with the at least one thermoplastic material of each of the first and second joint ends contacting each other. Yet another step includes inflating the at least one internal bladder so as to provide an internal pressure at the joint from within the first and second blade segments. The method also includes applying heat to the thermoplastic materials at the first and second joint ends so as to join the first and second rotor blade segments.

In one embodiment, the method may include placing at least one core material within the first and second blade segments at the joint. In another embodiment, the method may include placing the internal bladder between an upper portion of the core material and a lower portion of the core material. In other embodiments, the method may include placing the internal bladder around the core material. In a further embodiment, the method may include supplying external pressure at an outer surface of the joint. Still, in a further embodiment, the method may include deflating the internal bladder and leaving the internal bladder within the rotor blade. In one embodiment, inflating the internal bladder so as to provide pressure at the joint from within the first and second blade segments may include applying pressure to the internal bladder of about one (1) to about two (2) pounds per square inch (lbs./in.$^2$).

In additional embodiments, the method may include wrapping at least one of an outer surface or an inner surface of each of the first and second joint ends with the at least one thermoplastic material. In other embodiments, the method may include applying heat to the at least one thermoplastic material at the first and second joint ends via at least one of an external mat or a convection source.

In another aspect, the present disclosure is directed to a method for joining closed rotor blade segments of a rotor blade. The method includes placing at least one inflatable internal bladder at least partially within at least one of a first blade segment or a second blade segment. Another step includes arranging a first joint end of the first blade segment with a second joint end of the second blade segment at a joint. Yet another step includes inflating the at least one internal bladder so as to provide an internal pressure at the joint from within the first and second blade segments. The method also includes supplying external pressure to the joint via an external pressure source. In a further step, the method includes joining the first and second joint ends while the joint is under internal and external pressure so as to join the first and second rotor blade segments. Another step includes deflating the at least one internal bladder within the first and second blade segments. As such, the at least one internal bladder remains in place after the first and second joint ends are joined.

In one embodiment, the method may include encapsulating at least one of a first joint end of a first rotor blade segment or a second joint end of a second rotor blade segment in at least one thermoplastic material. In another embodiment, joining the first and second joint ends while the joint is under internal and external pressure so as to join the first and second rotor blade segments may include supplying heat to the joint. As such, the heat supplied to the joint may cause the at least one thermoplastic material of each of the first and second joint ends to join the first blade segment to the second blade segment at their respective joint ends.

In yet another aspect, the present disclosure is directed to a segmented rotor blade for a wind turbine. The segmented rotor blade includes a first rotor blade segment, a second rotor blade segment, at least one thermoplastic material, and an internal pressure source. The first rotor blade segment includes a first joint end. The second rotor blade segment includes a second joint end. The first and second joint ends are arranged together in an end-to-end orientation so as to form at least one scarf joint. The at least one thermoplastic material is arranged at each of the first and second joint ends. The first and second joint ends of the first and second rotor blade segments are bonded together via thermoplastic welding of the at least one thermoplastic material. The internal pressure source provides pressure to the scarf joint during the thermoplastic welding. The internal pressure source remains within the rotor blade after thermoplastic welding is complete.

In one embodiment, the at least one thermoplastic material may wrap around at least one of an outer surface or an inner surface of at least one of the first and second rotor blade segments. In a further embodiment, the internal pressure source may include an inflatable internal bladder. In yet another embodiment, the internal pressure source may further include at least one core material arranged between the first and second joint ends. In an additional embodiment, the core material may be arranged around the internal bladder. Still, in a further embodiment, the internal bladder is arranged around the core material.

In some embodiments, the first and second joint ends may form a double scarf joint. In another embodiment, the at least one thermoplastic material extends between the at least one core material and the inner surface of at least one of the first rotor blade segment or the second rotor blade segment. Such that, the at least one core material may be welded to the inner surface of at least one of the first rotor blade segment or the second rotor blade segment via the thermoplastic material.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
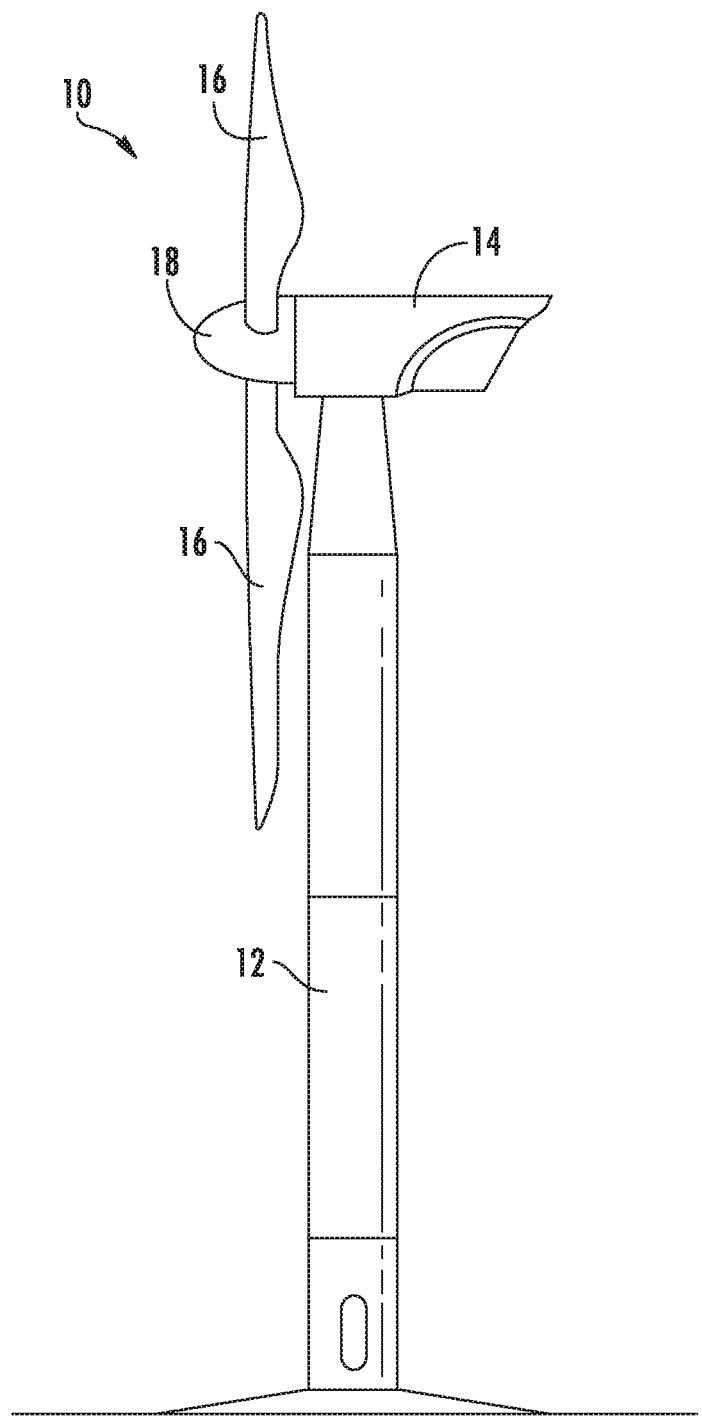
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a segmented rotor blade for a wind turbine and methods of manufacturing the same. For example, in one embodiment, the segmented rotor blade includes a first rotor blade component, a second rotor blade component, at least one thermoplastic material, and a disposable, internal pressure source (e.g. such as an inflatable internal bladder). The first rotor blade segment includes a first joint end, and the second rotor blade segment includes a second joint end. As such, the first and second joint ends are arranged together in an end-to-end orientation so as to form at least one scarf joint. The thermoplastic material(s) is arranged at each of the first and second joint ends. Thus, the first and second joint ends of the first and second rotor blade segments are bonded together via thermoplastic welding of the thermoplastic material(s). In addition, the internal pressure source provides internal pressure to the scarf joint during the thermoplastic welding. Moreover, the internal pressure source remains within the rotor blade after thermoplastic welding is complete. The internal pressure sources can be part bonded in the process to prevent them from becoming mobile.

The present disclosure provides many advantages not present in the prior art. For example, the use of a disposable bladder to supply internal pressure for a thermoplastic bond between the rotor blade segments is configured to reduce the labor hours required to form the joint. Accordingly, such bladders can be used in otherwise inaccessible, internal (blind) areas of the wind turbine blade. Thus, the joint of the present disclosure requires minimal to no rectification of the aerodynamic surface bond. Further, thermoplastic bonding occurs quickly and can be achieved in a wide variety of atmospheric conditions.

It should be appreciated that, although the present subject matter will generally be described herein with reference to components of a wind turbine, the disclosed method may be generally used to bond any two or more composite parts along a joint.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
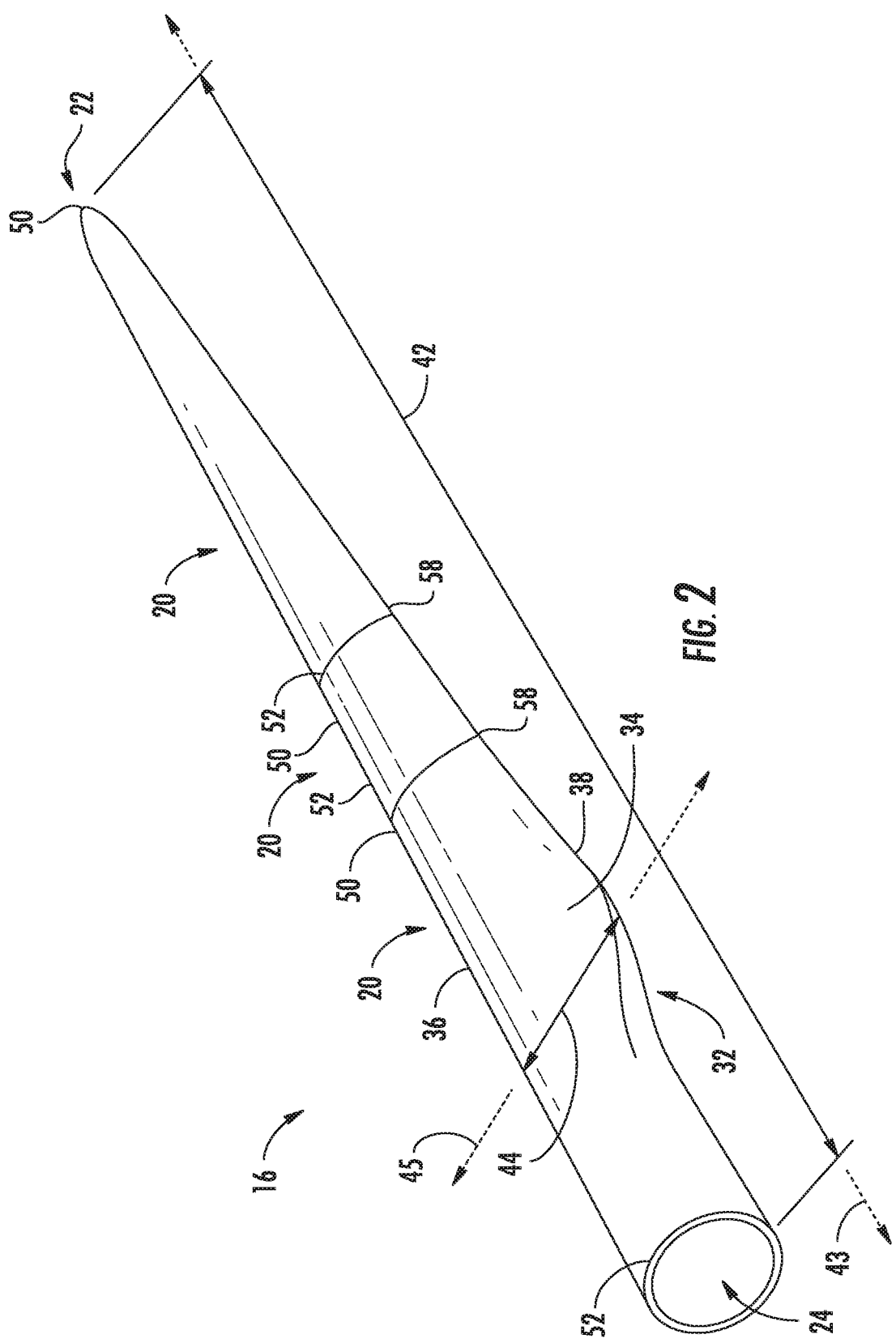
FIG. 2 illustrates a perspective view of one of the rotor blades of FIG. 1.

Referring now to FIG. 2, a perspective view of one embodiment of a rotor blade 16 of the wind turbine 10 of FIG. 1 according to the present disclosure is shown. As shown, the rotor blade 16 may include a plurality of individual blade segments 20 aligned in an end-to-end configuration from a blade tip 22 to a blade root 24. Further, as shown, each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16. As such, the rotor blade 16 may include any suitable number of segments 20. For example, as shown, the rotor blade 16 includes three rotor blade segments 20. It should be understood, however, that the rotor blade 16 may have any suitable number of blade segments 20, such as less than three or more than three, such as four or more.

In general, the rotor blade 16, and thus each blade segment 20, may include a pressure side 32 and a suction side 34 extending between a leading edge 36 and a trailing edge 38. Each blade segment 20 may include a first end 50 and a second end 52 defining the end points of each blade segment 20. Additionally, the rotor blade 16 may have a span 42 extending along a span-wise axis 43 and a chord 44 extending along a chord-wise axis 45. Further, as shown, the chord 44 may change throughout the span 42 of the rotor blade 16. Thus, a local chord may be defined at any span-wise location on the rotor blade 16 or any blade segment 20 thereof.

The rotor blade 16 may, in exemplary embodiments, be curved. Curving of the rotor blade 16 may entail bending the rotor blade 16 in a generally flapwise direction and/or in a generally edgewise direction. The flapwise direction is a direction substantially perpendicular to a transverse axis through a cross-section of the widest side of the rotor blade 16. Alternatively, the flapwise direction may be construed as the direction (or the opposite direction) in which the aerodynamic lift acts on the rotor blade 16. The edgewise direction is perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Figure 3:
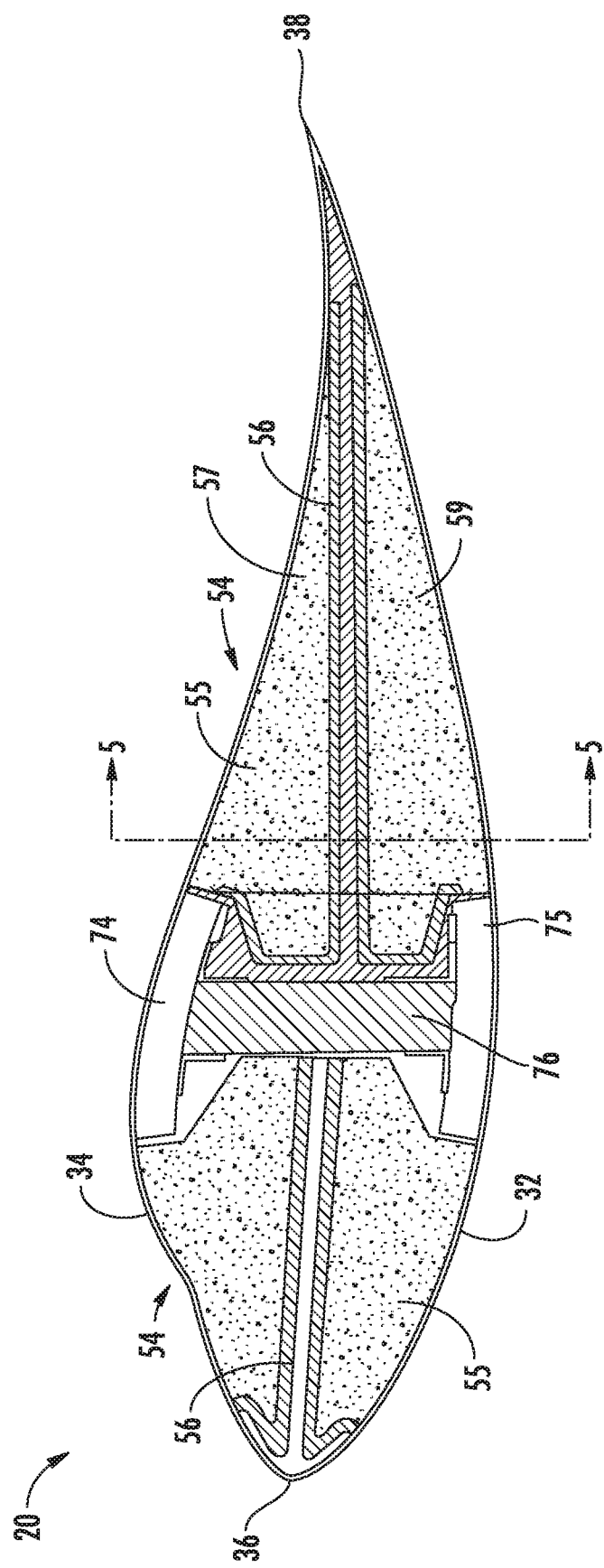
FIG. 3 illustrates a cross-sectional view of one embodiment of a segmented rotor blade according to the present disclosure.
Figure 4:
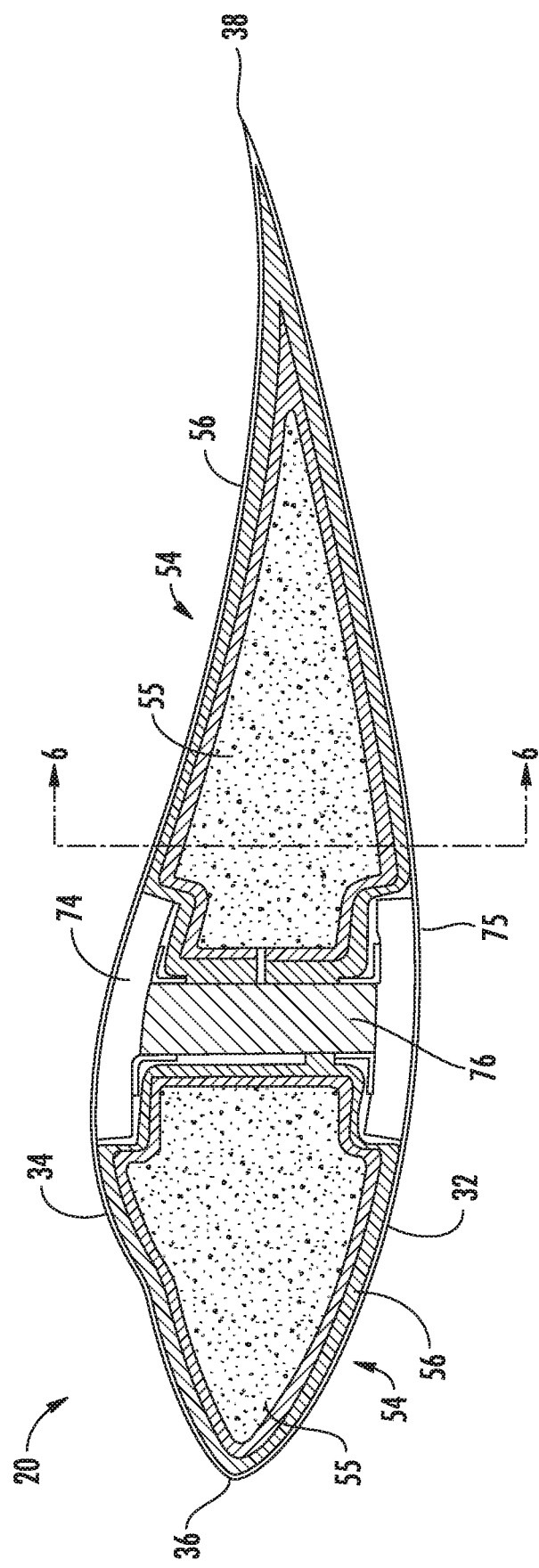
FIG. 4 illustrates a cross-sectional chord-wise view of another embodiment of a segmented rotor blade according to the present disclosure.
Figure 5:
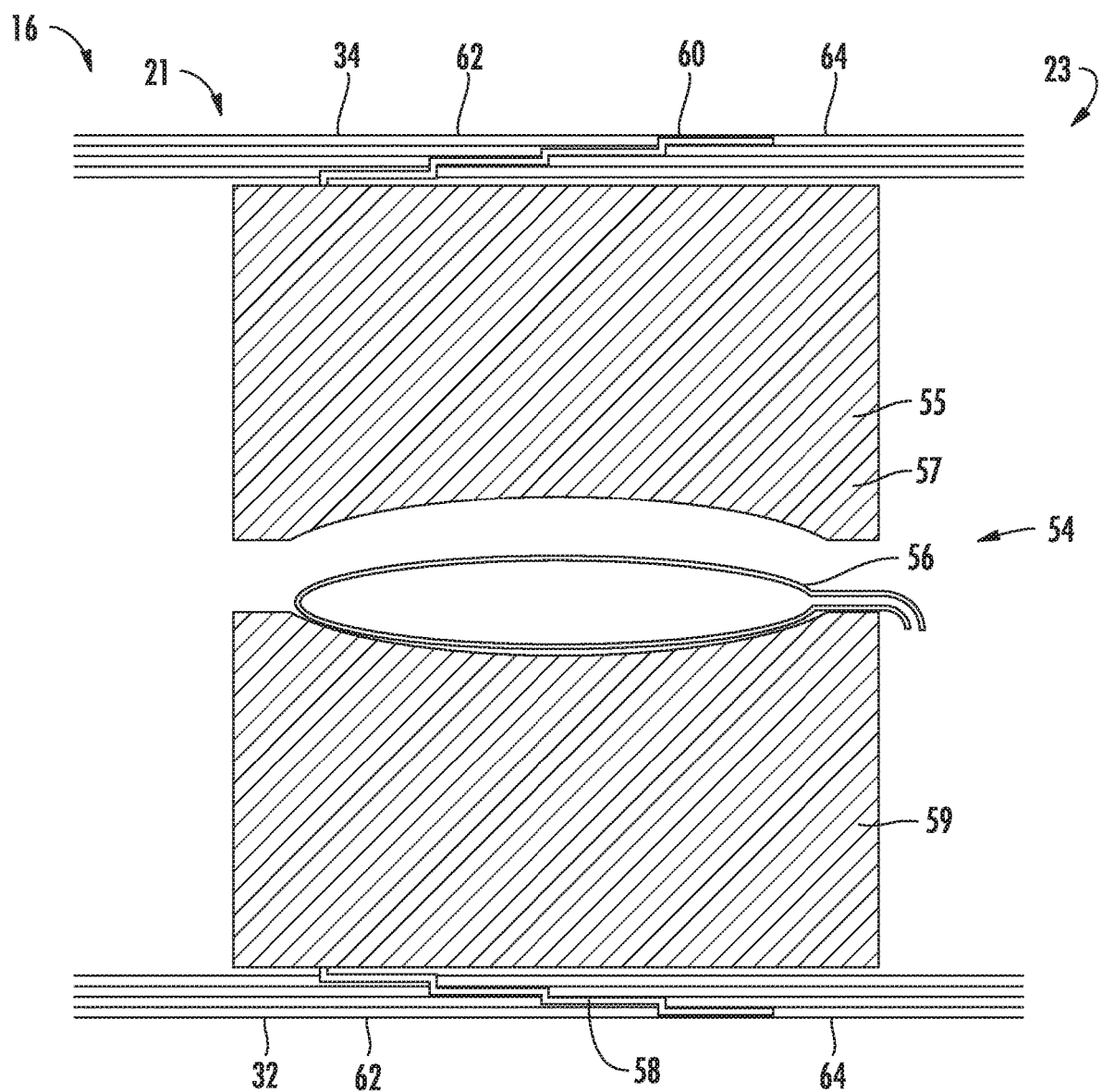
FIG. 5 illustrates a cross-sectional span-wise view of one embodiment of the segmented rotor blade of FIG. 3 along section line 5-5.
Figure 6:
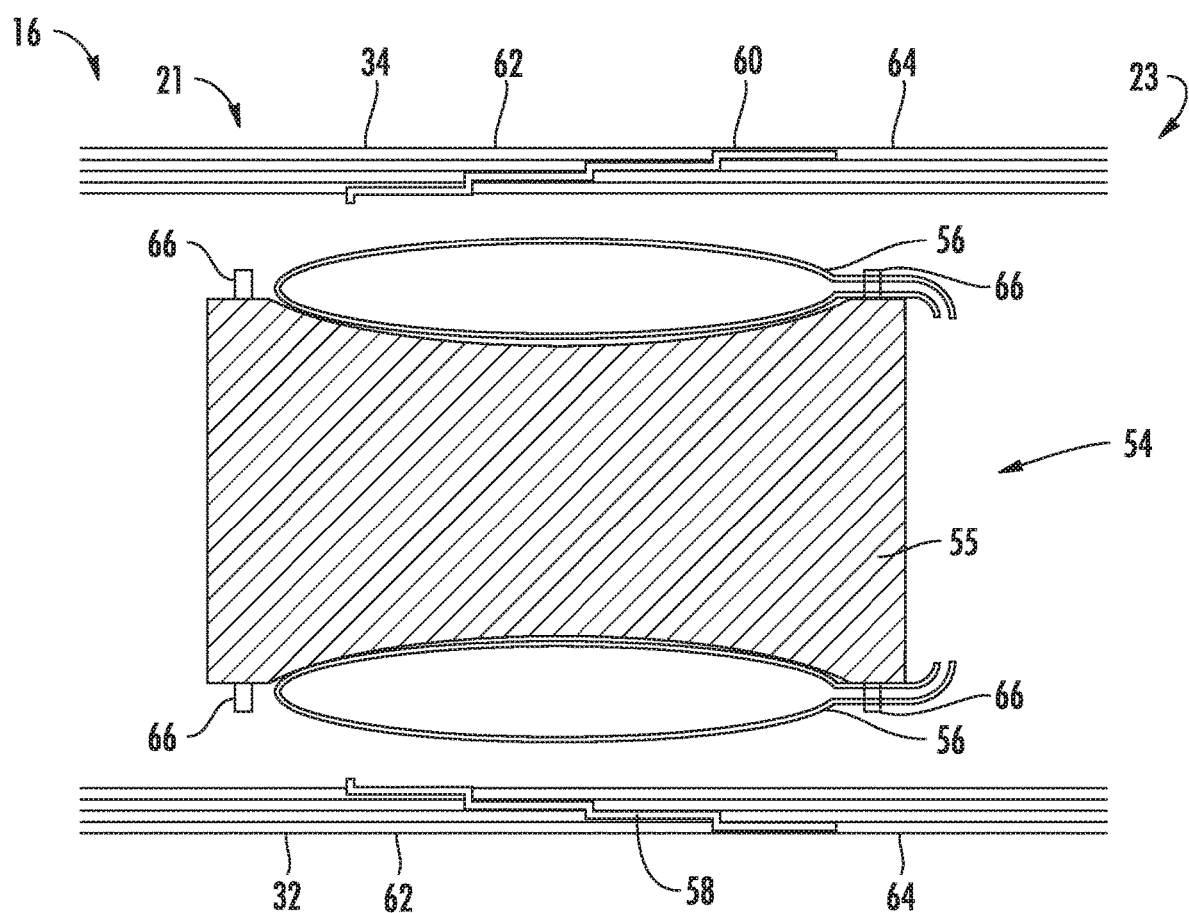
FIG. 6 illustrates a cross-sectional span-wise view of one embodiment of the segmented rotor blade of FIG. 4 along section line 6-6.

Referring now to FIGS. 3-6, various cross-sectional views of blade segment(s) 20 according to the present disclosure are illustrated. In particular, FIG. 3 illustrates a cross-sectional chord-wise view of one embodiment of a blade segment 20 having an internal bladder 56 and a core material 55 arranged therein. FIG. 4 illustrates a cross-sectional chord-wise view of another embodiment of a blade segment 20 with an internal bladder 56 and a core material 55 arranged therein. FIG. 5 illustrates a cross-sectional span-wise view of FIG. 3 along sectional line 5-5. FIG. 6 illustrates a cross-sectional span-wise view of FIG. 4 along sectional line 6-6.

In exemplary embodiments, and as discussed in detail below, the rotor blade segments 20 may be joined together through a joint 58, more particularly the joint 58 may be a scarf joint. Thus, a portion of each of the rotor blade segments 20 may be scarfed (i.e. angled or tapered), to form a joint face with an adjacent blade segment 20 scarfed to have a corresponding joint end. More specifically, one joint end 64 may generally correspond to a male half of a scarf joint that is secured into an opposite joint end 62 that corresponds to a female half of a scarf joint. As such, the joint ends 62, 64 may be connected and fastened together to form the scarf joint, which will be described in more detail herein.

It should be recognized that though the illustrated embodiments depict a rotor blade 16 with a monolithic shell, other types of shells can be used. For example, one or more portions of the shell may be configured as a layered construction and may include a core material, formed from a lightweight material such as wood (e.g., balsa), foam (e.g., extruded polystyrene foam) or a combination of such materials, disposed between layers of laminate composite material.

Referring now to FIGS. 3 and 4, as shown and partially discussed above, the blade segment 20 includes a pressure side 32, a suction side 34, a leading edge 36, and a trailing edge 38 each extending between a first end 50 and a second end 52 (shown in FIG. 2). Further, as shown, the rotor blade segment 20 includes an inner surface 70 and an outer surface 72 that partially define the aerodynamic profile of the rotor blade 16. Further, as shown, the blade segment 20 may include one or more spar caps 74, 75 on either or both of the pressure or suction sides 32, 34 of the rotor blade 16. In addition, the rotor blade 16 may also include a shear web 76 extending between the spar caps 74, 75.

More specifically, as shown in FIGS. 5 and 6, the rotor blade 16 is formed from at least a first rotor blade segment 21 and a second rotor blade segment 23, at least one thermoplastic material 60, and an internal pressure source 54. Further, as shown, the first rotor blade segment 21 includes a first joint end 62, and the second rotor blade segment 23 includes a second joint end 64. Moreover, the first and second joint ends 62, 64 may correspond to either the first end 50 or the second end 52 of one of the blade segments 20. Further, as shown, the first and second joint ends 62, 64 are arranged together in an end-to-end orientation so as to form at least one scarf joint 58. In addition, as shown, the thermoplastic material(s) 60 may be arranged at each of the first and second joint ends 62, 64. As such, the first and second joint ends 62, 64 may be bonded together via thermoplastic welding of the thermoplastic material(s) 60.

Further, as shown, the internal pressure source 54 is configured to provide pressure to the scarf joint 58 during thermoplastic welding. Moreover, the internal pressure source 54 is designed to remain within the rotor blade 16 after thermoplastic welding is complete. More specifically, the internal pressure source 54 may include at least one of an inflatable internal bladder 56 or a core material 55. Further, in particular embodiments, the internal bladder(s) 56 of the present invention may be formed from plastic or aerospace-type films. As such, the core material(s) 55 may position and orient the internal bladder(s) 56 in proximity to its desired location. Such placement can remove the necessity of using high pressure to inflate the internal bladder(s) 56, allowing a thinner walled, lighter bladder. Such internal bladders 56 can be manufactured cheaper than other bladders known in the art, such as those made from silicon. For instance, the internal bladder(s) 56 may be left inside the rotor blade 16 where it may be cost prohibitive to leave bladders made from materials such as silicon.

For example, as shown in FIGS. 3-6, the internal pressure source 54 may include an inflatable internal bladder 56 arranged between opposing core materials 55 with the first and second blade segments 21, 23 at the joint 58. As such, the core material(s) 55 and/or the internal bladder 56 can provide the internal pressure on the inner surface 70 of the rotor blade 16 at the joint 58. Such internal pressure assists in forming a suitable bond at the joint 58 during thermoplastic welding of the first and second blade segments 21, 23. In certain embodiments, the core material(s) 55 described herein may include foam bulkheads, balsa wood bulkheads, and/or any other suitable core material.

Referring particularly to FIGS. 3 and 5, the core material(s) 55 may be arranged around the internal bladder 56 to form the internal pressure source 54. For example, as shown in FIG. 3, multiple core materials 55 are arranged around internal bladders 56. In particular, an upper core material 57 and a lower core material 59 surround the internal bladder 56. In such embodiments, once the internal bladders 56 are inflated, internal pressure is applied to the core materials 55 and subsequently to the inner surface 70 of the rotor blade 16. As can be seen in FIG. 5, the pressure applied on the inner surface 70 supplies sufficient internal pressure to form a strong bond at the scarf joint 58. In addition, the internal bladder 56 and core material 55 provide internal pressure at the first and second joint ends 62, 64 so as to provide a strong bond when the thermoplastic material(s) 60 is welded.

Referring now to FIGS. 4 and 6, the internal bladder 56 may be arranged around the core material 55. For example, as shown in FIG. 4, multiple internal bladders 56 are arranged around the core materials 55. Referring particularly to FIG. 6, the core material 55 may be recessed in order to secure the internal bladder 56 in place. Additionally, the core material 55 may include lugs 66 to further secure the internal bladders 56 in place and prevent them from shifting. Once the internal bladders 56 are inflated, pressure is directly applied to the inner surface 70 of the rotor blade 16 by the internal bladders 56. More specifically, the core materials 55 can be used to orient and secure the internal bladders 56 for a desirable internal pressure distribution. For example, the shape of the core material 55 can help to place the internal bladders 56 in a desirable location to supply internal pressure to the joint 58.

Pressure may be supplied to the internal bladder(s) 56 via a tube or multiple tubes supplying a pressurized fluid, such as air. In certain embodiments, the tube may be approximately a quarter inch in diameter and be fed to the internal bladder 56 through a small corresponding hole in the turbine blade 16. Once the thermoplastic material 60 has set, the tube may be cut. Further, the remaining tube end may be pushed inside the rotor blade 16. As such, the remaining hole may be left open or may be filled with a plug.

Figure 7:
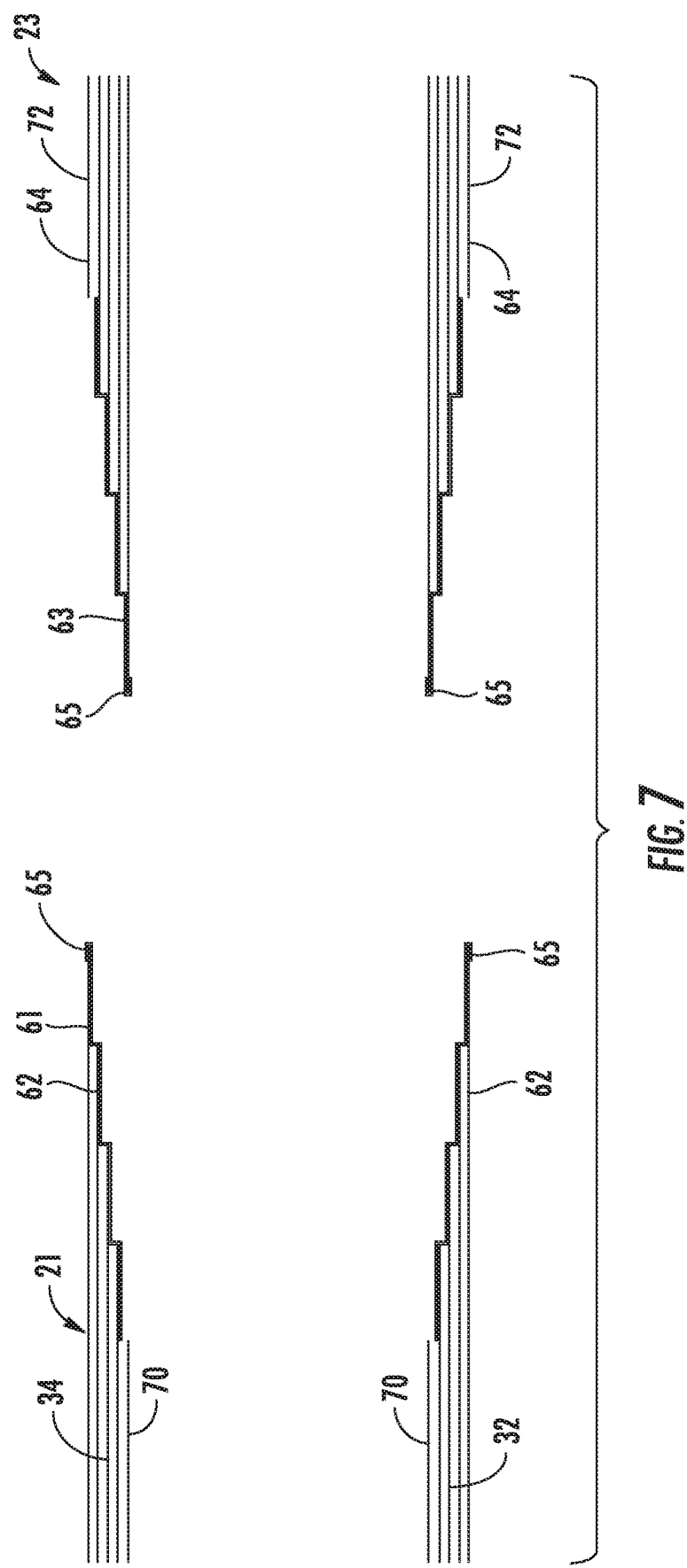
FIG. 7 illustrates a cross-sectional span-wise view of one embodiment of the segmented rotor blade of FIG. 5 before the rotor blade segments are placed together and with the internal structures omitted.
Figure 8:
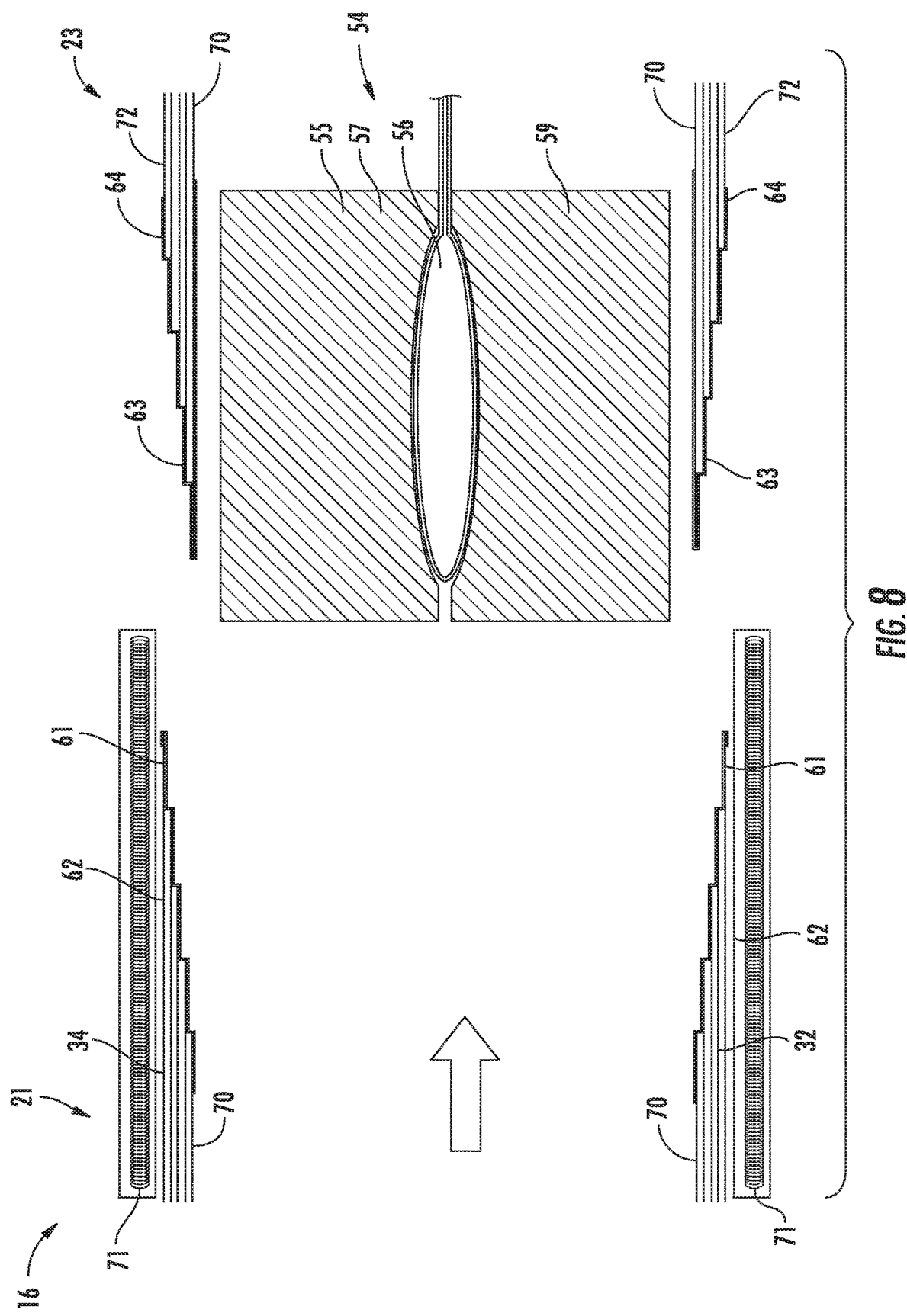
FIG. 8 illustrates a cross-sectional span-wise view of one embodiment of the segmented rotor blade of FIG. 5 before the rotor blade segments are placed together.

Referring now to FIGS. 7 and 8, the first and second blade segments 21, 23 are shown prior to thermoplastic welding. Particularly, FIG. 7 shows the first and second blade segments 21, 23 with the internal structures omitted. Thus, as shown in the illustrated embodiment, the thermoplastic material(s) 60 may wrap around either or both of the inner or outer surfaces 70, 72 of either or both of the first and second rotor blade segments 21, 23. For example, as shown, a first thermoplastic material 61 may be wrapped around the inner surface 70 of the first joint end 62 of the first rotor blade segment 21. Similarly, a second thermoplastic material 63 may be wrapped around the outer surface 72 of the second joint end 64 of the second rotor blade segment 23. As shown here, wrapping the thermoplastic material(s) 60 allows for the use of one thermoplastic piece at each joint end 62, 64 and for full coverage of the joint ends 62, 64 with minimal thermoplastic material(s) 60 and lower labor costs. In other embodiments, the first and second joint ends 62, 64 may be encapsulated in the thermoplastic material(s) 60 by any method known in the art. For example, strips of the thermoplastic material 60 may be layered at the joint ends 62, 64.

Referring particularly to FIG. 7, the thermoplastic material 60 may wrap back on itself at the joint ends 62, 64. For example, as shown, the first and second thermoplastic materials 61, 63 wrap around and encapsulate the outer composite fiber layer at the thinnest part of the ply 65. Wrapping the thermoplastic material(s) 60 around the thinnest part of the ply 65 can help to prevent degradation and peeling of the thermoplastic material(s) 60.

Referring particularly to FIG. 8, heat source(s) 71 are shown adjacent to at least one of the blade segments 20. The heat source(s) 71 may include an external heating mat or convection heating of the entire joint 58. In further embodiments, heat may also be supplied by a clamp-shell tool. As shown in FIG. 8, the heat source 71 may include a heating mat including conducting coils with a specified resistance and current designed to heat the thermoplastic material(s) 60 to a desired temperature at a desired rate.

Referring particularly to FIGS. 5 and 8, the thermoplastic material(s) 60 may also extend between the core material(s) 55 and the inner surface 70 of the first and second rotor blade segments 21, 23. As such, the core material(s) 55 may also be welded to the inner surface 70 of the first and second rotor blade segments 21, 23 via the thermoplastic material 60. More particularly, as shown in FIG. 8, the thermoplastic material(s) 60 may wrap around and extend between the inner surface 70 of the rotor blade 16 and the core materials 55 at the joint 58. Thus, the core materials 55 may also be welded to the blade segment(s) 20. In another embodiment, the core materials 55 may be bonded to the inner surface 70 prior to curing the thermoplastic material 60. For example, the core materials 55 may be tac bonded pre-assembly using hot glue or another adhesive.

Referring particularly to FIGS. 5-8, the first and second joint ends 62, 64 may form a double scarf joint at the joint 58. As can be seen in the figures, both the pressure side 32 and the suction side 34 each include a scarf joint 58. More particularly, as shown, each of the joint ends 62, 64 are scarfed around the entirety of the pressure side 32 and suction side 34. As such, the double scarf joint 58 forms a hoop around the joint ends 62, 64. Further, the first and second joint ends 62, 64 are thermoplastically welded together at the double scarf joint 58. It should also be recognized that the pressure side 32 and suction side 34 of the joint ends 62, 64 need not be symmetrical. For example, the suction side 34 of the joint end 62 may be the female half of the scarf joint, whereas the pressure side 32 of the joint end 62 may be the male half of the scarf joint.

The thermoplastic material 60 as described herein generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, aliphatic polyurethane, or any other suitable amorphous thermoplastic material. In addition, exemplary semi-crystalline thermoplastic materials may generally include, but are not limited to polyolefins, polyamides, fluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Figure 9:
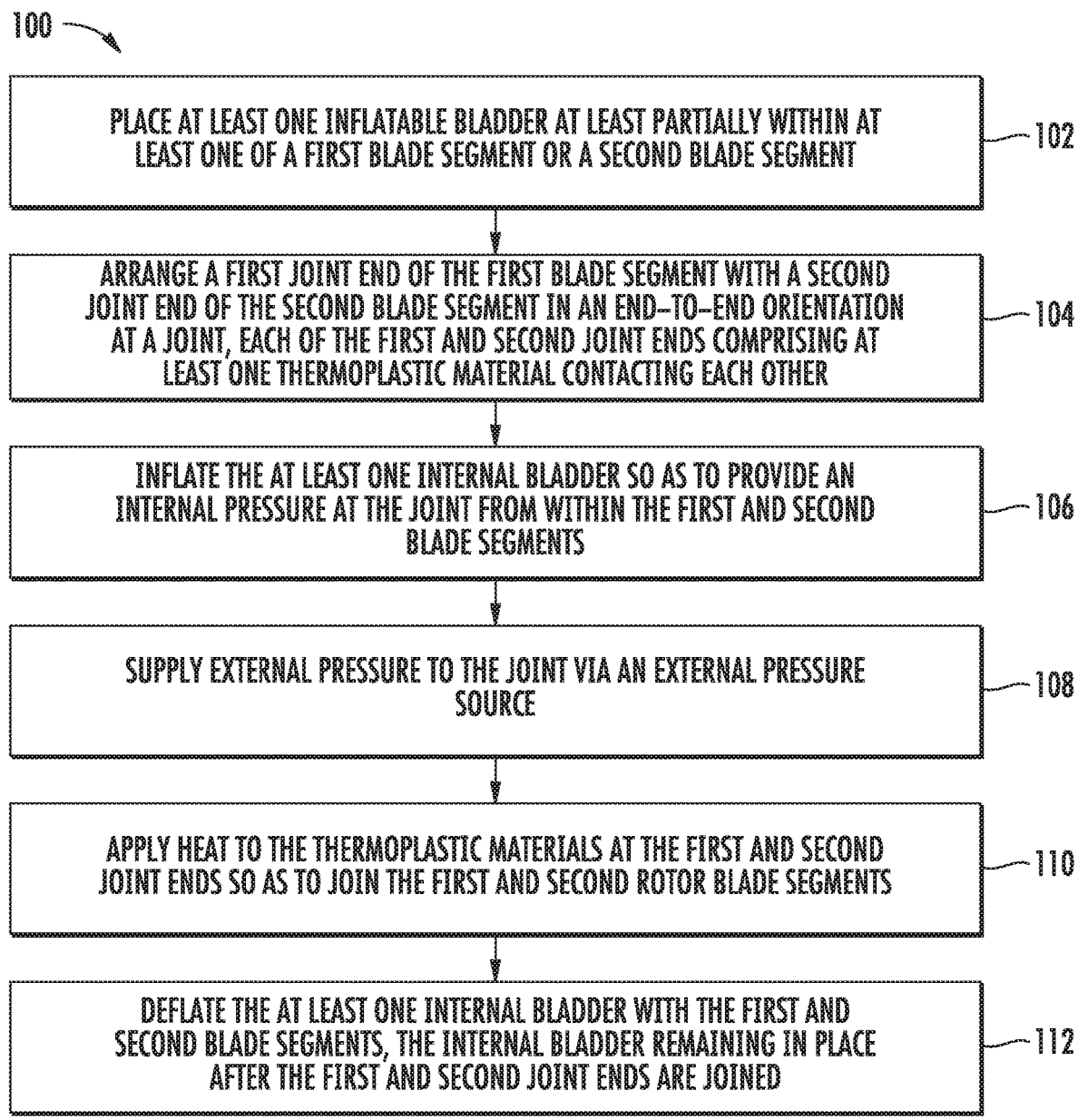
FIG. 9 illustrates a flow diagram of one embodiment of a method of joining rotor blade segments of a rotor blade according to the present disclosure.

The present disclosure is also directed to methods for joining the rotor blade segments 20 of the rotor blade 16. For example, as shown in FIG. 9, a flow diagram of one embodiment of a method 100 for joining rotor blade segments 20 of the rotor blade 16 is illustrated. As shown at 102, the method 100 includes placing at least one inflatable internal bladder 56 at least partially within at least one of the first blade segment 21 or the second blade segment 23. As shown at 104, the method 100 includes arranging the first joint end 62 of the first blade segment 21 with the second joint end 64 of the second blade segment 23 at a joint 58. Further, as mentioned, each of the first and second joint ends 62, 64 include at least one thermoplastic material 60 in contact with each other. In additional embodiments, the method 100 may include wrapping either or both of the inner or outer surfaces 70, 72 of each of the first and second joint ends 62, 64 with the thermoplastic material(s) 60.

As shown at 106, the method 100 also includes inflating the at least one internal bladder 56 so as to provide an internal pressure at the joint 58 from within the first and second blade segments 21, 23. More specifically, in one embodiment, the method 100 may include inflating the internal bladder 56 to apply pressure thereto ranging from about one (1) to about fifteen (15) pounds per square inch (lbs./in.$^2$). In another embodiment, pressure may be applied to the internal bladder 56 ranging from about one (1) to about (2) pounds per square inch (lbs./in.$^2$).

In addition, in some embodiments, the method 100 may include placing at least one core material 55 within the first and second blade segments 21, 23 at the joint 58. In another embodiment, the method 100 may include placing the internal bladder 56 between an upper portion of the core material 57 and a lower portion of the core material 59. In other embodiments, the method 100 may include placing the internal bladder 56 around the core material 55.

Referring still to FIG. 9, as shown at 108, the method includes supplying external pressure to the joint 58 via an external pressure source. The external pressure may be supplied by any method known in the art. For example, the external pressure source may include an external, inflatable bladder(s), a clamp-shell tool, and/or an assembly jig. As shown at 110, the method includes applying heat to the thermoplastic material(s) 60 at the first and second joint ends 62, 64 so as to join the first and second rotor blade segments 21, 23. In some embodiments, the heat may be applied via an external heat source 71 such as a mat, convection source, and/or clamp-shell tool. As shown at 112, the method includes deflating the at least one internal bladder 56 within the first and second blade segments 21, 23. As such, the at least one internal bladder 56 remains in place after the first joint end 62 and second joint end 64 are joined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for joining rotor blade segments of a rotor blade, the method comprising:
   positioning an upper core material adjacent to a first inner surface of a first side of the rotor blade at a joint between a first blade segment and a second blade segment of the rotor blade;
   positioning a separate, a lower core material adjacent to an opposing, second inner surface of a second side of the rotor blade at the joint between the first blade segment and the second blade segment;
   placing at least one inflatable internal bladder between the upper and lower core materials;
   arranging a first joint end of the first blade segment with a second joint end of the second blade segment at the joint, each of the first and second joint ends comprising at least one thermoplastic material;
   arranging the first and second joints ends in an end-to-end orientation with the at least one thermoplastic material of each of the first and second joint ends contacting each other;
   inflating the at least one internal bladder so as to provide a localized internal pressure to the joint of the first and second blade segments from within the rotor blade via the upper and lower core materials; and,
   applying heat to the thermoplastic materials at the first and second joint ends so as to join the first and second rotor blade segments.

2. The method of claim 1, further comprising deflating the internal bladder and leaving the internal bladder within the rotor blade.

3. The method of claim 1, further comprising wrapping at least one of an outer surface or an inner surface of each of the first and second joint ends with the at least one thermoplastic material.

4. The method of claim 1, wherein inflating the internal bladder so as to provide pressure at the joint from within the first and second blade segments further comprises applying pressure to the internal bladder of one (1) pounds per square inch (lbs./in.2) to two (2) lbs./in.2.

5. The method of claim 1, further comprising applying heat to the at least one thermoplastic material at the first and second joint ends via at least one of an external mat or a convection source.

6. A method for joining closed rotor blade segments of a rotor blade, the method comprising:
   providing a core material at least partially within at least one of a first blade segment or a second blade segment;
   placing an upper internal bladder atop the core material and a lower internal bladder below the core material, the upper internal bladder being adjacent to a first inner surface of the first blade segment and the lower internal bladder being adjacent to a second inner surface of the second blade segment;
   arranging a first joint end of the first blade segment with a second joint end of the second blade segment at a joint;
   inflating the upper and lower internal bladders to provide an internal pressure at the joint from within the first and second blade segments;
   joining the first and second joint ends while the joint is under internal pressure so as to join the first and second rotor blade segments; and,
   deflating the upper and lower internal bladders within the first and second blade segments, the upper and lower internal bladders remaining in place after the first and second joint ends are joined.

7. The method of claim 6, further comprising encapsulating at least one of a first joint end of a first rotor blade segment or a second joint end of a second rotor blade segment in at least one thermoplastic material.

8. The method of claim 7, wherein joining the first and second joint ends while the joint is under internal pressure so as to join the first and second rotor blade segments further comprises supplying heat to the joint, wherein the heat causes the at least one thermoplastic material of each of the first and second joint ends to join the first blade segment to the second place segment at their respective joint ends.

\* \* \* \* \*